(12) United States Patent
Tang (10) Patent No.: US 9,714,368 B2
(45) Date of Patent: Jul. 25, 2017

(54) EXTRUDABLE PRESSURE SENSITIVE NON-BLACK ADHESIVE COMPOSITION AND METHODS FOR PREPARING THE SAME

(71) Applicant: FIRESTONE BUILDING PRODUCTS CO., LLC, Indianapolis, IN (US)

(72) Inventor: Jiansheng Tang, Carmel, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 0 days.

(21) Appl. No.: 14/652,520

(22) PCT Filed: Dec. 18, 2013

(86) PCT No.: PCT/US2013/076013
§ 371 (c)(1),
(2) Date: Jun. 16, 2015

(87) PCT Pub. No.: WO2014/100120
PCT Pub. Date: Jun. 26, 2014

(65) Prior Publication Data
US 2015/0329748 A1    Nov. 19, 2015

Related U.S. Application Data

(60) Provisional application No. 61/738,421, filed on Dec. 18, 2012.

(51) Int. Cl.
*C09J 123/28* (2006.01)
*C08K 3/22* (2006.01)
*C09J 123/22* (2006.01)

(52) U.S. Cl.
CPC ............... *C09J 123/28* (2013.01); *C08K 3/22* (2013.01); *C09J 123/22* (2013.01); *C08K 2003/2241* (2013.01)

(58) Field of Classification Search
CPC .............................. C09J 109/00; C09J 123/22
See application file for complete search history.

(56) References Cited

U.S. PATENT DOCUMENTS 2,356,128 A    8/1944   Thomas et al.
2,944,576 A    7/1960   Acosta
5,667,858 A *  9/1997   Pokorny ................ C09J 7/0214
                                              428/343
(Continued)

FOREIGN PATENT DOCUMENTS

EP    1 739 127 A1    1/2007
WO    2008/000493     1/2008
(Continued)

OTHER PUBLICATIONS

International Search Report and Written Opinion for Appl. Serial No. PCT/US2013/076013 dated May 16, 2014, pp. 1-6.

*Primary Examiner* — Lanee Reuther
(74) *Attorney, Agent, or Firm* — Thomas Kingsbury; Arthur M. Reginelli (57) ABSTRACT

A pressure-sensitive adhesive polymeric composition comprising the blend or reaction product of butyl rubber, an olefinic polymer component, filler that includes titanium dioxide, and an unfunctionalized phenolic resin, where the composition is devoid of isocyanate or isocyanate residue.

26 Claims, 2 Drawing Sheets

(56) References Cited

U.S. PATENT DOCUMENTS

| | | |
|---|---|---|
| 6,451,897 B1 | 9/2002 | Niyogi |
| 2008/0261471 A1 | 10/2008 | Chen et al. |
| 2010/0143651 A1 | 6/2010 | Silvis et al. |
| 2013/0302550 A1* | 11/2013 | Tang .................. C08J 3/246 |
| | | 428/40.9 |

FOREIGN PATENT DOCUMENTS

| | | |
|---|---|---|
| WO | 2011/137217 | 11/2011 |
| WO | 2012/065145 | 5/2012 |

* cited by examiner

EXTRUDABLE PRESSURE SENSITIVE NON-BLACK ADHESIVE COMPOSITION AND METHODS FOR PREPARING THE SAME

This application is a National-Stage application of PCT/US2013/076013 filed on Dec. 18, 2013, which claims priority to U.S. Provisional Application Ser. No. 61/738,421, filed on Dec. 18, 2012, which are incorporated herein by reference.

FIELD OF THE INVENTION

Embodiments of the present invention are directed toward non-black extrudable pressure sensitive adhesive compositions and methods for making the same; the compositions are particularly useful as a seaming tape for polymeric roofing membranes.

BACKGROUND OF THE INVENTION

Flat or low-sloped roofs are often covered with polymeric membranes, which protect the roof from environmental impact such as snow and rain.

These polymeric membranes are typically manufactured and shipped in widths that are narrower than the roof surface to which they are installed. Accordingly, multiple membranes are often installed, and adjacent membranes are seamed together.

Pressure sensitive seam tapes are often employed for this purpose. Specifically, a pressure sensitive seam tape is applied to one surface of a membrane along a longitudinal edge and an adjacent membrane is mated along its longitudinal edge to the top surface of the pressure sensitive seam tape to thereby form a seam.

Polymeric roofing membranes have historically been black in color. This color derives from the use of carbon black filler, which has been used to provide the membrane with advantageous mechanical properties. In warmer climates, however, it is believed that the black color absorbs solar energy and thereby places larger energy demands on those systems attempting to cool the building structures. In face of these concerns, the industry has provided white polymeric roofing membranes. While black tape can be used in conjunction with these white membranes, there is nonetheless a desire to employ white tape in conjunction with white membranes.

Although some white tapes have been employed in the industry, they suffer several drawbacks. First, they lack the strength and mechanical properties associated with black adhesive tape. Second, they require significant cure time, which reduces manufacturing efficiencies and increases costs. Also, due to the level of curing, the compositions behave as thermoset materials and are therefore not reprocessable.

WO 2011/137217 teaches heat-processable tape compositions that can be prepared by mixing butyl rubber, first and second phenolic resins, and isocyanate. The first and second phenolic resins include functionalized and unfunctionalized phenolic resins. WO 2012/065145 teaches a heat-processable tape composition that is white in color and can prepared by mixing butyl rubber, an unfunctionalized phenolic resin, an isocyanate, and thermoplastic resin.

SUMMARY OF THE INVENTION

One or more embodiments of the present invention provide a pressure-sensitive adhesive polymeric composition comprising the blend or reaction product of butyl rubber, an olefinic polymer component, filler that includes titanium dioxide, and an unfunctionalized phenolic resin, where the composition is devoid of isocyanate or isocyanate residue.

Still other embodiments of the present invention provide a method for producing a pressure-sensitive adhesive polymeric composition, the method comprising charging a halogenated butyl rubber, a thermoplastic polymer, and an unfunctionalized phenolic resin to a reaction extruder, charging a metal oxide to the reaction extruder, and charging a filler that includes titanium dioxide.

DETAILED DESCRIPTION OF ILLUSTRATIVE EMBODIMENTS

Embodiments of the present invention are based, at least in part, on the discovery of a butyl rubber-based heat-processable white tape composition that is substantially devoid of isocyanate residue. Thus, while the prior art contemplates butyl rubber-based tape compositions, particularly white tape compositions, that employ an isocyanate, it has unexpectedly been discovered that tape compositions comparable to those prepared in the prior art can be prepared without isocyanate. In one or more embodiments, the tape compositions of the invention are prepared by blending butyl rubber, unfunctionalized phenolic resin, thermoplastic polymer, tackifier resin, and oil. In one or more embodiments, these compositions can be manufactured continuously within a reactive extruder. These white tape compositions are particularly useful as seaming tape for use with white roofing systems such as white EPDM or TPO roofing membranes.

Ingredients

In preparing the compositions of the present invention, one or more of the following ingredients may be employed.

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated such as in the case of chlorinated and brominated butyl rubber. In one or more embodiments, these halogenated polymers may derive from monomer such as parabromomethylstyrene.

In one embodiment, where butyl rubber includes an isobutylene-isoprene copolymer, the copolymer may include from about 0.5 to about 30, or in other embodiments from about 0.8 to about 5, percent by weight isoprene based on the entire weight of the copolymer with the remainder being isobutylene.

In the case of halogenated butyl rubbers, the butyl rubber may include from about 0.1 to about 10, or in other embodiments from about 0.3 to about 7, or in other embodiments from about 0.5 to about 3 percent by weight halogen based upon the entire weight of the copolymer or terpolymer.

In one or more embodiments, the glass transition temperature (Tg) of useful butyl rubber can be less than about −55° C., or in other embodiments less than about −58° C., or in other embodiments less than about −60° C., or in other embodiments less than about −63° C.

In one or more embodiments, the Mooney viscosity (ML$_{1+8}$@125° C.) of useful butyl rubber can be from about 25 to about 75, or in other embodiments from about 30 to about 60, or in other embodiments from about 40 to about 55.

Useful butyl rubber includes those prepared by polymerization at low temperature in the presence of a Friedel-Crafts catalyst as disclosed within U.S. Pat. Nos. 2,356,128 and 2,944,576, which are incorporated herein by reference. Other methods may also be employed.

Butyl rubber can be obtained from a number of commercial sources as disclosed in the Rubber World Blue Book. For example, halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ (ExxonMobil Chemical Co.), star branched butyl rubbers are available under the tradename STAR BRANCHED BUTYL™ (ExxonMobil Chemical Co.), and brominated isobulylene-isoprene copolymer with high Mooney viscosity is available under the tradename Lanxess Bromobutyl X2 (Lanxess, Inc.).

In one or more embodiments, the thermoplastic polymer includes one or more olefinic polymers and/or copolymers. In particular embodiments, the polymers or copolymers include mer units deriving from the polymerization of propylene monomer; accordingly, these polymers or copolymers may be referred to as propylene-based polymers or copolymers.

In particular embodiments, at least one of the olefinic polymers is a propylene-based copolymer, which includes mer units deriving from the polymerization of propylene, together with comonomer selected from ethylene and/or C4-C20 α-olefins. In certain embodiments, the propylene-based copolymers include mer units deriving from the polymerization of propylene and ethylene; which copolymers may be referred to as propylene-ethylene copolymers.

In one or more embodiments, the olefinic component includes a reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel), such as CA10A, which is believed to include in-reactor blends of ethylene-propylene rubber and polypropylene or polypropylene copolymers, or ADFLEX™, 359P. In one or more embodiments, the in-reactor copolymers may be physically blended with other polyolefins. For example, in-reactor copolymers may be blended with linear low density polyethene.

In one or more embodiments, the olefinic component includes a propylene-ethylene copolymer that has a combination a combination of two, three or more (e.g., a combination of all) of the following characteristics: (a) a molecular weight distribution (MWD) of about 1.5 to about 4 (e.g., 2 to 3 or less than 2.5 or 2.0); (b) a melt flow rate (at 230° C.) (MFR) (per ASTM D1238) of at least about 0.3 (e.g., at least about 0.5 g/10 min or at least about 1.0 g/10 min) or in the range from about 0.3 to about 50 g/10 min (e.g., 2 to 25 g/10 min or 3 to a 15 g/10 min); (c) a density (per ASTM D792) of about 0.80 to about 0.95 g/cc and more particularly about 0.85 to 0.91 (e.g. 0.858 to 0.888 g/cc or); (d) a comonomer content of about 3 to 25 wt % (e.g., a C2 or ethylene content of 5 to 20 wt % or 8 to 15 wt %); (e) a glass transition temperature (Tg) of about 0 to about −50° C. (e.g., −15 to −35° C.); (f) a melting range from about 40 to about 160° C. (e.g., 50 to 135° C. or less than 115° C. or less than 105° C.); (g) a shore A hardness from about 25 to about 100, and more particularly about 40 to about 90 (e.g., 50 to 75); (h) a heat of fusion (DSC) (ASTM D3417-97) of about 2 to 75% of homoisotactic polypropylene and more particularly 5 to 65% (e.g. less than 60% or less than 55%); and (i) a flexural modulus (per ISO 178) of about 5 to 1000 MPa, or more particularly from 8 to 325 MPa (e.g., 10 to 280 MPa), or higher (e.g., in excess of 2000 MPa or). By way of example, without limitation, such material may have a flexural modulus of about 8 to about 325 MPa (e.g., about 10 to 280 MPa), an ethylene content of about 3 to 25 wt %, and optionally a peak melting peak below about 135° C., a shore A hardness from about 25 to about 100, and more particularly about 40 to about 90 (e.g., 50 to 75); or a combination of both. A commercially available example of one such copolymer is available under the tradename VERSIFY™ (The Dow Chemical Company). These propylene-ethylene copolymers are believed to be described in U.S. Publication Nos. 2008/0261471 and 2010/0143651, which are incorporated herein by reference. Other suitable polypropylene-based polymers include VISTAMAXX™ polymers (e.g., 6102, 6202, and 3000 (ExxonMobil Chemical Co.). These propylene-ethylene copolymers are believed to be described in WO 2008/000493, which is incorporated herein by reference. Still other commercial products that are believed to be useful include LICOCENE™ polymers (Clariant), EASTO-FLEX™ polymers (Eastman Chemical Co.), REXTAC™ polymers (Hunstman), and VESTOPLAST™ polymers (Degussa).

The phenolic resin is devoid or substantially devoid of terminal functional groups, and therefore it may be referred to as the unfunctionalized phenolic resin. In one or more embodiments, the unfunctionalized phenolic resin is unreactive or substantially unreactive with butyl rubber, and therefore is referred to as unfunctionalized or unreactive phenolic resin.

In one or more embodiments, the unreactive phenolic resin may include those defined by the formula where each $R^3$ is independently a divalent organic group, each $R^2$ is independently a monovalent organic group, and m is an integer from 0 to 20.

In one or more embodiments, each $R^3$ is devoid of heteroatoms. In these or other embodiments, each $R^2$ is devoid of heteroatoms. In these or other embodiments, each $R^2$ is a sterically hindered or highly branched alkyl group. In one or more embodiments, each phenol substituent within the resin may include further substitution (i.e, one or more hydrogen atoms attached to the phenol ring may be replaced with an alkyl group); the substituents that form the substituted phenol are devoid of heteroatoms.

In one or more embodiments, the unfuctionalized phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the second phenolic resin may be formed by an acid-catalyzed reaction.

Unfunctionalized phenolic resins may be obtained under the tradename SP-1068 (Schenectady International; Schenectady, N.Y.). SP-1068 is believed to be an octylphenol-formaldehyde resin that is devoid or substantially devoid of terminal functional groups such as halogen atoms or methylol groups.

In one or more embodiments, a metal oxide may be employed. It is believed that the metal oxide may serve or play several roles in the formation of the composition. For example, it is believed that the metal oxide can catalyze some crosslinking of the butyl rubber and/or catalyze crosslinking of the butyl rubber with the phenolic resin. These may include alkali metal oxides, alkali earth metal oxides, and transition metal oxides. In particular embodiments, the metal oxide is magnesium oxide, and in other embodiments the metal oxide is calcium oxide. In other embodiments, the metal catalyst may be an organometal such as magnesium resinate.

In one or more embodiments, a catalyst, which is believed to promote crosslinking between the phenolic resin and the butyl rubber, is an amine compound. Exemplary amine catalysts include triethylenediamine (TEDA), dimethylcyclohexylamine (DMCHA), dimethylethanolamine (DMEA), tetramethylbutanediamine (TMBDA), pentamethyldipropylenetriamine, N-(3-dimethylaminopropyl)-N,N-diisopropanolamine, 1,3,5-(tris(3-dimethylamino) propyl)-hexahydro-s-triazine, bis-(2-dimethylaminoethyl) ether, N-ethylmorpholine, triethylamine (TEA), 1,8-diazabicyclo [5.4.0]undecene-7 (DBU), pentamethyldiethylenetriamine (PMDETA), benzyldimethylamine (BDMA), pentamethyldiethylene triamine (PMDETA), 2,4,6-tris[(dimethylamino) methyl]phenol, tributyl amine, N-methyl morpholine, and N-ethyl morpholine.

In one or more embodiments, the compositions of the present invention may include oil, which may also be referred to as processing oil or extender oil. These extenders may include high-boiling hydrocarbons. Examples of these oils include paraffinic oils, aromatic oils, naphthenic oils, vegetable oils, and low PCA oils including MES, TDAE, and SRAE, and heavy naphthenic oils, and various synthetic oils such as, but not limited, polybutene oils. In one or more embodiments, the oil employed is selected based upon its compatibility with the rubber, as well as its ability to provide advantageous properties to the final composition (e.g., green strength or tack).

In particular embodiments, a polybutene oil is employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

In these or other embodiments, oils or extenders may be used as carriers for one or more of the various ingredients employed in preparing the compositions. When used as a carrier, the oils may, especially where it may be disadvantageous to heat the oil (e.g., when used as a carrier for a catalyst), include low viscosity or low molecular weight oils. In other words, where a low molecular weight or low viscosity oil is employed, the oil, along with the constituent that it carries, can be injected into the composition without heating. Exemplary low-viscosity oils may be characterized by a viscosity at 100° C. of less than 80 cst, in other embodiments less than 70 cst, or in other embodiments less than 60 cst. In these or other embodiments, these low-viscosity oils may be characterized by a molecular weight of less than 100 g/mole, or in other embodiments less than 700 g/mole. An exemplary low-viscosity oil is a polybutene oil available under the tradename Indapol H25 (Ineos).

In one or more embodiments, the compositions of the present invention may include fillers or pigments to impart whiteness to the compositions. In one or more embodiments, fillers include clay, talc, mica, titanium dioxide, calcium carbonate, and/or silica.

In one or more embodiments, titanium dioxide is used for improving whiteness, brightness, and opacity within the polymeric composition. In one or more embodiments, titanium dioxide has a refractive index of from about 2.55 to about 2.7, a specific gravity of from about 3.7 to about 4.2, and a pH of from about 6.5 to about 8.5. Useful $TiO_2$ is available under the tradenames Ti-Pure® R-960, which is a fine, white powder having a specific gravity of 3.9, and TIOXIDE® (DuPont). Another suitable titanium dioxide product is CR-800 (TRONOX), which is believed to be characterized by a titanium dioxide content of about 96% and specific gravity of about 3.8 to about 4.1.

Useful clays include hydrated aluminum silicates. In one or more embodiments, useful clays can be represented by the formula $Al_2O_3SiO_2.XH_2O$. Exemplary forms of clay include kaolinite, montmorillonite, atapulgite, illite, bentonite, halloysite, and mixtures thereof. In one embodiment, the clay is represented by the formula $Al_2O_3SiO_2.3H_2O$. In another embodiment, the clay is represented by the formula $Al_2O_3SiO_2.2H_2O$. In a preferred embodiment, the clay has a pH of about 7.0.

Useful talcs include hydrated magnesium silicates. In one or more embodiments, talc can be represented by the formulae $Mg_3Si_4O_{10}(OH)_2$ or $3MgO.4SiO_2.H_2O$. Exemplary forms of talc include talcum, soapstone, steatite, cerolite, magnesium talc, steatite-massive, and mixtures thereof. Talc filler may contain various other minerals such as dolomite, chlorite, quartz, and the like. Talc used as filler may also exhibit characteristics such as hydrophobicity, organophilicity, non-polarity, and chemically inertness. In one embodiment, the talc has a specific gravity of from about 2.6 to about 2.8, a pH of from about 7.0 to 8.7, a refractive index of about 1.57 at 23° C., and a moisture content of less than about 0.5 weight percent. A representative talc is Talc 9107, which is available from Polar Minerals (Mt. Vernon, Ind.), which is non-abrasive, chemically inert, has a specific gravity of about 2.8, a pH of about 8.7, a refractive index of about 1.57 at 23° C., and a moisture content of less than about 0.3 weight percent.

Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms are available from PPG Industries, Inc. (Monroeville, Pa.), Degussa Corporation (Parsippany, N.J.) and J.M. Huber Corporation (Atlanta, Ga.). One useful commercial product is Rubbersil® RS-150, which is characterized by a BET surface area of 150 m$^2$/g, tapped density of 230 g/liter, pH (5% in water suspension) of 7, SiO2 content of 98%, Na2SO4 content of 2%, and Al2O3 content of 0.2%. In at least one embodiment, silica filler may be used without any other mineral fillers.

In one or more embodiments, the compositions of the invention include UV stabilizer and/or other additives, such as antioxidants, that will protect the various constituents from the solar radiation and/or heat. In one or more embodiments, the compositions of this invention include a hindered amine light stabilizer. Exemplary light stabilizers are commercially available under the tradename Tinuvin PUR 866, 292, and 770 (BASF).

In one or more embodiments, the tackifier resins may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer includes styrene, indene, derivatives of styrene, derivatives of indene, and combinations thereof.

In one or more embodiments, examples of tackifier resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In certain embodiments, the synthetic aliphatic or aromatic hydrocarbon resins may be characterized by a number average molecular weight ($M_n$) of from about 400 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer. In particular embodiments, the dicyclopentadiene tackifier resin is hydrogenated. Hydrogenated dicyclopentadiene tackifier resins are commercially available from Neville.

In one or more embodiments, synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized.

The hydrocarbon resins may be characterized by an aromatic content of from about 1 to about 60, in other embodiments from about 2 to about 40, and in other embodiments from about 5 to about 10. In one or more embodiments, the tackifier resins are hydrogenated or partially hydrogenated; useful resins include those that are at least 50 percent, in other embodiments at least 80 percent, in other embodiments at least 95 percent, and in other embodiments at least 99 percent or fully hydrogenated. For example, the hydrocarbon resin prior to grafting may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the tackifier resin may be characterized by a softening point of from about 15° C. to about 210° C., in other embodiments from about 65° C. to about 170° C., and in other embodiments from about 90° C. to about 140° C. Softening point can be determined according to ASTM E-28 (Revision 1996). In particular embodiments, especially where a propylene copolymer is employed, at least one tackifier resin is employed that is characterized by a softening point of less than 120° C., in other embodiments less than 110° C., and in other embodiments less than 107° C.; this tackifier resin, which may be referred to as a low-softening point tackifier resin, may have a softening point from 90° C. to 120° C., in other embodiments from 95° C. to 110° C., and in other embodiments from 100° C. to 107° C. In certain embodiments, the low-softening point tackifier resin may be used in conjunction with a second tackifier resin having a higher softening point. The second tackifier resin, which may be referred to as a high-softening point tackifier resin, may be characterized by having a softening point in excess of 120° C., in other embodiments in excess of 125° C., and in other embodiments in excess of 130° C.; this high-softening point tackifier resin may have a softening point of from 120° C. to 150° C., in other embodiments from 125° C. to 145° C., and in other embodiments from 130° C. to 137° C.

In these or other embodiments, the tackifier resin may be characterized by a glass transition temperature of less than 120° C., in other embodiments less than 110° C., and in other embodiment from about 60° C. to about 80° C. Glass transition temperature may be determined according to ASTM D 341-88 by using differential scanning calorimetry.

In these or other embodiments, the tackifier resin may be characterized by a Saponification number (mg KOH/g resin material) of greater than 10, in other embodiments greater than 15, and in other embodiments greater than 19.

In these or other embodiments, the tackifier resin may be characterized by an acid number greater than 10, in other embodiments greater than 15, and in other embodiments greater than 20, and in other embodiments greater than 25.

In addition to the foregoing constituents, the membranes of this invention may also optionally include homogenizing agents, processing aids such as waxes, flame retardants, zinc oxide, stearic acid, antioxidants, antiozonants, processing additives, fillers and mixtures thereof. Certain embodiments may be substantially devoid of any of these constituents.

Preparation of Composition

In one or more embodiments, the adhesive compositions of this invention may be prepared by mixing the butyl rubber, phenolic resin, and thermoplastic polymer. The preparation of this composition may take place within a reaction extruder such as a twin-screw extruder or a planetary extruder.

Each of the individual ingredients may be added to the extruder either individually or together as one or more pre-blended mixtures or masterbatches. For example, in one embodiment, the butyl rubber and the phenolic resin may be formed into a masterbatch by employing a mixer that is separate from the reaction extruder. The masterbatch may then be charged to the extruder. In alternate embodiments, the butyl rubber, phenolic resin, and thermoplastic polymer, optionally together with the other solids ingredients, may be charged directly to the feed throat of the extruder using conventional techniques. In particular embodiments, the butyl rubber, the thermoplastic polymer, the phenolic resin, and the talc are preblended under ambient conditions and fed to the extruder as a solids mixture. Within the mixing apparatus, the ingredients can be subjected to conditions of high shear and mixing.

Figure 1:
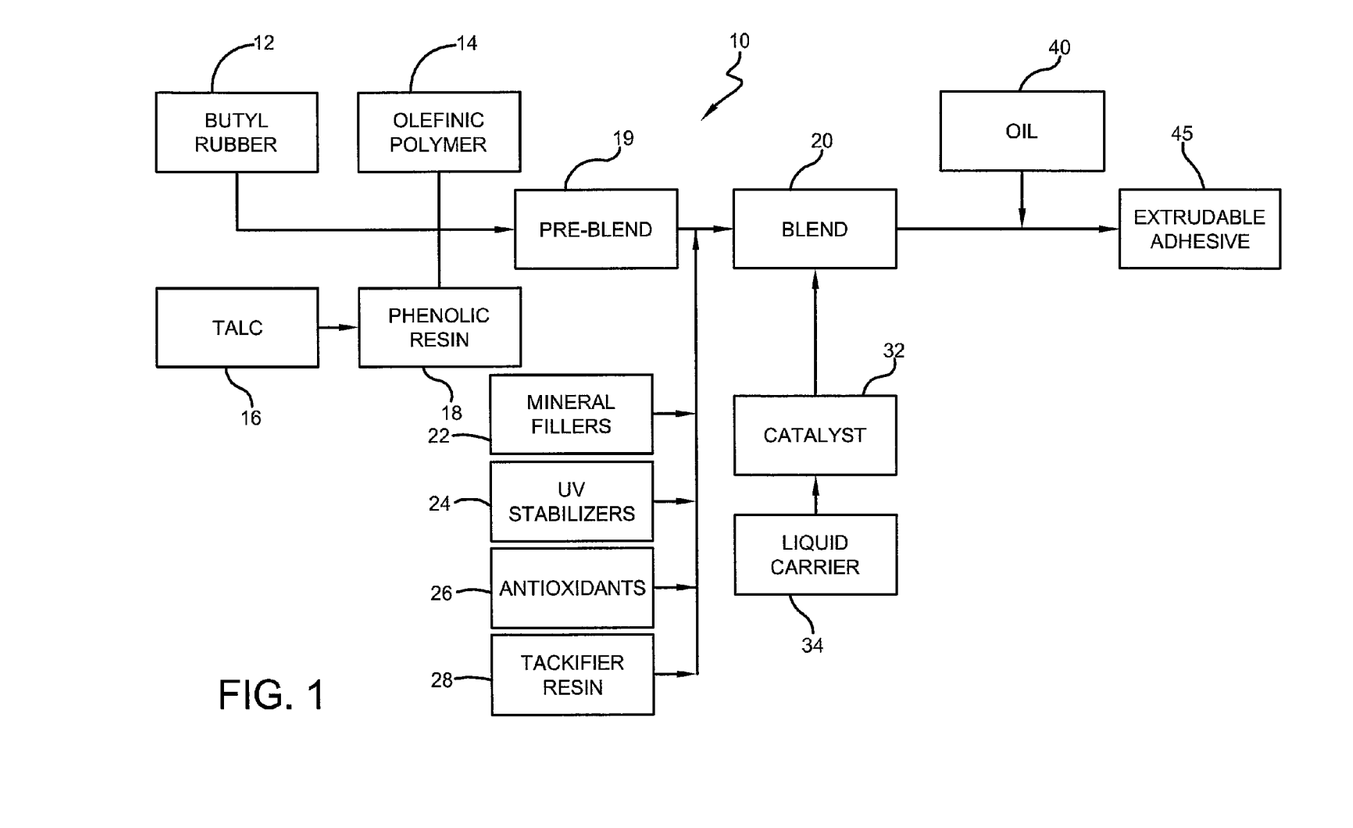
FIG. 1 is a flow chart showing a process for preparing compositions of one or more embodiments of the present invention.

In one or more embodiments, a reaction scheme for preparing the white adhesive composition is described with reference to FIG. 1. The process 10 includes introducing butyl rubber 12, thermoplastic polymer 14, talc 16, and phenolic resin 18 to form first blend 19. It has been found that the presence of the talc assists in maintaining the blend as a free-flowing mixture. As those skilled in the art appreciate, butyl rubber is typically provided in a bail form, and therefore the process may include the step of grinding the butyl rubber prior to introducing the butyl rubber with the other ingredients. The butyl rubber bails can also be fed into the extruder through a bail side feeder.

First blend 19 may be formed with or combined with additional solids ingredients, such as but not limited to, additional mineral fillers 22 (e.g., titanium dioxide and calcium oxide) antioxidants 24, UV stabilizers 26, and the like to form second blend 20.

The second blend may be introduced with a catalyst. This catalyst may be introduced in conjunction with a liquid carrier (i.e. dispersed within an oil).

In these or other embodiments, the temperature of the composition may be reduced prior to exiting the extruder. For example, the temperature may be cooled to about 180° F. to about 220° F., and in other embodiments from about 190° F. to about 210° F.

A variety of rubber and/or plastic processing equipment can be employed in the process of the present invention. For example, the compositions can be prepared in continuous-mixing apparatus such as twin-screw or planetary extruders. In a particular embodiment, the composition is prepared within a continuous extruder. The extruder can have dimensions, in terms of length to diameter (L/D), of at least 40/1, in other embodiments at least 45/1, and in other embodiments equal to or at least 50/1. As in generally known in the art, extruders of this nature (which may also be referred to as reaction extruders), may include a plurality of barrels, and within each barrel two or more screws may be positioned. These screws can be equipped with a variety of screw elements, which elements can accomplish a variety of mixing parameters including, without limitation, conveying, high intensity mixing, kneading, and backmixing. Each barrel can be heated or cooled as desired, ingredients can be added at one or more barrels, and gases can be removed at one or more barrels.

Figure 2:
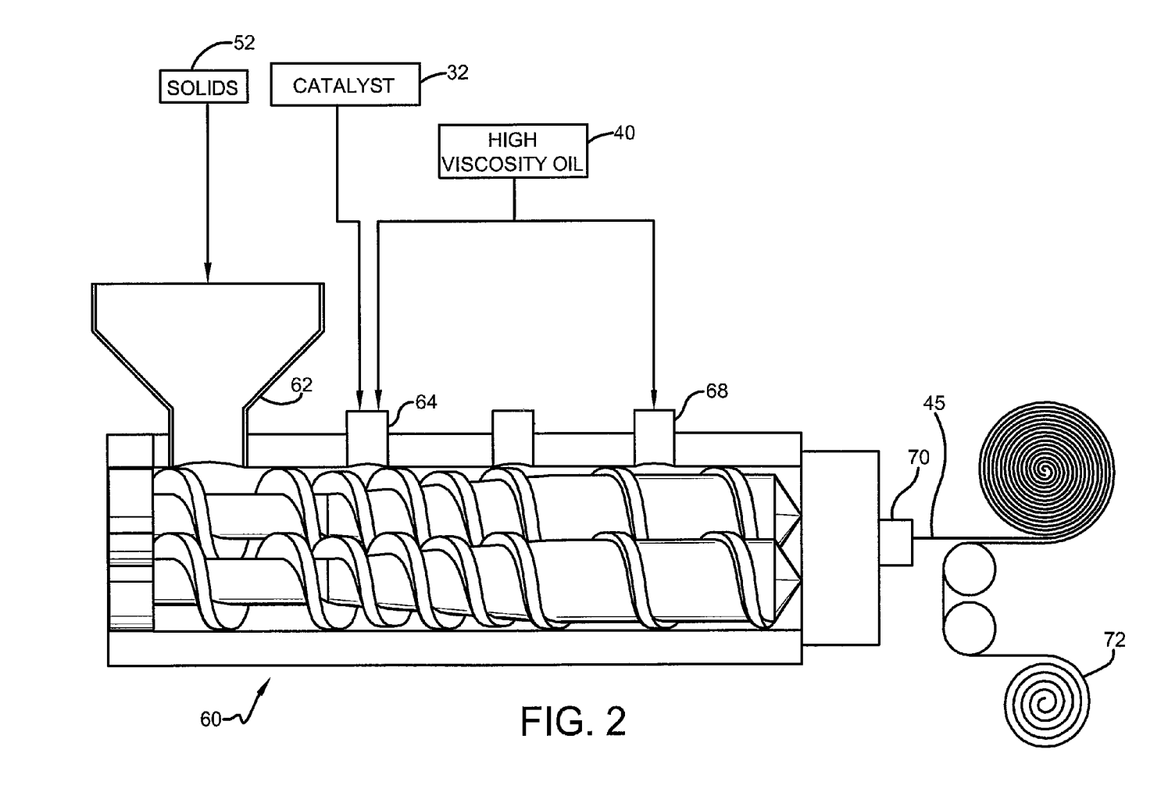
FIG. 2 is a schematic showing a process for making compositions of one or more embodiments of the invention within a continuous extruder.

FIG. 2 shows exemplary extruder 60. In one or more embodiments, the solids ingredients 52, which may include butyl rubber 12, olefinic polymer 14, talc 16, and unfunctionalized phenolic resin 18 (shown in FIG. 1), are introduced in the feed throat 62 of extruder 60. In conjunction therewith, the other solid ingredients, such as the titanium dioxide, calcium oxide, antioxidants, UV stabilizers, and the like, can also be introduced into the extruder via feed throat 62. The various solids ingredients may be added by way of a pellet feeder and/or by way of a powder feeder. These ingredients may then be mixed, and a temperature of about 200° F. to about 280° F. is maintained for about the first 2/5 (i.e. about 24 L/D) of the extruder.

The amine catalyst (e.g. dispersed within a carrier oil) is then introduced at a downstream injection point of the extruder which may be at a barrel located at about 24 L/D, and mixing is continued for about another 12 L/D to disperse the amine catalyst in the partially crosslinked rubber. Another way to feed the amine catalyst or diluted amine catalyst is to directly feed the catalyst into the first injection pipe with, for example, the high viscosity oil. Together with the introduction of amine catalyst 32 or shortly thereafter, the temperature of the composition may be increased (e.g. 200° F.-250° F.).

Following introduction of the amine catalyst, the temperature of the composition may be reduced (e.g., 180° F.-220° F.) in order to facilitate further processing of the composition after leaving the extruder (e.g., placing the composition on a release paper or film). High viscosity oil 18 may be added at various locations in the process. For example, oil may be injected at barrels located about 3/10 L/D and 7/10 L/D (i.e. the $1^{st}$ and $3^{rd}$ injection points 64 and 68) as shown in FIG. 2.

In one or more embodiments, extrudable adhesive 45 may be extruded through a die 70. The die may positioned directly to or adjacent to extruder 60, or additional extruders (not shown) may be employed. For example, a melt pump (not shown) may be used between the die and the extruder. The die may be used to form a generally planar extrudate that may be deposited onto a release paper or film 72. The resulting laminate (i.e. adhesive deposited onto release paper or film) may then be wound for subsequent storage, transport, and use.

Ingredient Amounts

In one or more embodiments, the compositions of the present invention may be prepared by employing at least 20 percent by weight, in other embodiments at least 25 percent by weight, and in other embodiments at least 30 percent by weight butyl rubber based on the total weight of the composition. In these or other embodiments, the compositions of the present invention can be prepared by employing less than 65 percent by weight, in other embodiments less than 60 percent by weight, and in other embodiments less than 55 percent by weight butyl rubber based on the total weight of the composition.

In one or more embodiments, the compositions of the present invention may be prepared by employing at least 1 percent by weight, in other embodiments at least 3 percent by weight, and in other embodiments at least 5 percent by weight of the olefinic component based on the total weight of the composition. In these or other embodiments, the compositions of the present invention can be prepared by employing less than 50 percent by weight, in other embodiments less than 40 percent by weight, and in other embodiments less than 30 percent by weight of the olefinic component based on the total weight of the composition.

In one or more embodiments, the compositions of the present invention can be prepared by employing at least 0.5 percent by weight, in other embodiments at least 1.0 percent by weight, and in other embodiments at least 1.5 percent by weight unfunctionalized phenolic resin based on the total weight of the composition. In these or other embodiments, the compositions may be prepared by employing less than 30 percent by weight, in other embodiments less than 25 percent by weight, and in other embodiments less than 20 percent by weight unfunctionalized phenolic resin (non-reactive resin) based on the total weight of the composition.

In one or more embodiments, the compositions of the present invention can be prepared by employing at least 0.25 in other embodiments at least 0.3, and in other embodiments at least 0.4 percent by weight metal oxide (e.g., calcium oxide) based on the total weight of the composition. In these or other embodiments, the compositions may be prepared by employing less than 5, in other embodiments less than 4, and in other embodiments less than 3 percent by weight metal oxide based on the total weight of the composition.

In one or more embodiments, the compositions of the present invention may be prepared by employing at least 50 ppm, in other embodiments at least 100 ppm, and in other embodiments at least 150 ppm amine catalyst based on the total weight of the composition. In these or other embodiments, the compositions of the present invention include less than 5,000 ppm, in other embodiments less than 4,000 ppm, and in other embodiments less than 3,000 ppm amine catalyst based on the total weight of the composition.

In one or more embodiments, the amine catalyst can be introduced as an oil solution or slurry. This blend or slurry may include from about 0.5 to about 40 weight percent, in other embodiments from about 0.8 to about 30 weight percent, and in other embodiments from 1 to 25 weight percent of the amine catalyst, with the balance including an oil.

In one or more embodiments, the compositions of the present invention include at least 15 in other embodiments at least 20, and in other embodiments at least 25 percent by weight oil based on the total weight of the composition. In these or other embodiments, the compositions of the present invention include less than 60 in other embodiments less than 55, and in other embodiments less than 35 percent by weight oil based on the total weight of the composition.

In one or more embodiments, the compositions of the present invention include at least 0 in other embodiments at least 1, and in other embodiments at least 2 percent by weight talc based on the total weight of the composition. In these or other embodiments, the compositions of the present invention include less than 12 in other embodiments less than 10, and in other embodiments less than 8 percent by weight talc based on the total weight of the composition.

In one or more embodiments, the compositions of the present invention include at least 1 in other embodiments at least 2, and in other embodiments at least 3 percent by weight titanium dioxide based on the total weight of the composition. In these or other embodiments, the compositions of the present invention include less than 12 in other embodiments less than 10, and in other embodiments less than 8 percent by weight titanium dioxide based on the total weight of the composition.

In one or more embodiments, the compositions of the present invention can be prepared by employing at least 0.5 percent by weight, in other embodiments at least 1 percent by weight, in other embodiments at least 2 percent by weight, in other embodiments at least 5 percent by weight, 10 percent by weight, in other embodiments at least 20 percent by weight, and in other embodiments at least 35 percent by weight tackifier resin based on the total weight of the composition. In these or other embodiments, the compositions may be prepared by employing less than 70 percent by weight, in other embodiments less than 60 percent by weight, in other embodiments less than 55 percent by weight, in other embodiments at least 40 percent by weight, in other embodiments at least 30 percent by weight, and in other embodiments at least 20 percent by weight tackifier resin based on the total weight of the composition. In particular embodiments, a blend of a high-softening point and a low-softening point tackifier resin is employed. In one or more embodiments, the weight ratio of the high-softening point tackifier resin to the low-softening point tackifier resin may be from 0.2:1 to 1.5:1, in other embodiments from 0.5:1 to 1.2:1, and in other embodiments from 0.8:1 to 1.1:1.

In one or more embodiments, the compositions of the present invention are substantially devoid of isocyanate or isocyanate residue. By substantially devoid, the compositions include that amount or less of isocyante than would otherwise have an appreciable impact on the compositions. In one or more embodiments, the compositions of the invention include less than 1, in other embodiments less than 0.5, and in other embodiments less than 0.1 percent by weight isocyanate or isocyanate residue based on the total weight of the composition.

Product Characteristics

Advantageously, the white adhesive composition demonstrates desirable tack, and strength without the need for further curing the composition.

In one or more embodiments, using the color "L", "a", "b" test method and based on the Hunter color scheme (L=0, black; L=100, white), the composition of the present invention has a whiteness of at least an L value of 70, in other embodiments at least an L value of 75, or in other embodiments at least an L value of 80.

In one or more embodiments, the composition of the present invention is characterized by a reflectivity, accordingly to ASTM C 1549, of at least 70 percent, in other embodiments at least 73 percent, and in other embodiments at least 75 percent.

In one or more embodiments, the composition of the present invention may include at least 20% by weight, in other embodiments at least 25% by weight, and in other embodiments at least 30% by weight butyl rubber, based upon the entire weight of the composition. In these or other embodiments, the composition may include less than 65% by weight, in other embodiments less than 60% by weight, and in other embodiments less than 55% by weight butyl rubber, based upon the entire weight of the composition.

In one or more embodiments, these discrete domains or olefinic polymer domains exist within the composition up to a temperature of about 37° C., in other embodiments about 55° C., in other embodiments about 80° C., in other embodiments about 100° C., and in other embodiments about 120° C.

In one or more embodiments, the compositions may be characterized by a peel strength (ASTM D 413; aged 24 hours at room temperature and tested at room temperature) of at least 3.0 pounds per lineal inch (pli), in other embodiments at least 4.0 pli, and in other embodiments at least 4.5 pli.

In one or more embodiments, the compositions may be characterized by a peel strength (ASTM D 413; aged 24 hours at 158° F. and tested at 158° F.) of at least 1.0 pli, in other embodiments at least 1.5 pli, and in other embodiments at least 2.0 pli.

In one or more embodiments, the compositions may be characterized by a tensile strength (ASTM D 412) of at least 40 psi, in other embodiments at least 50 psi, and in other embodiments at least 55 psi.

In one or more embodiments, the compositions may be characterized by a maximum elongation (ASTM D 412) of at least 300%, in other embodiments at least 400%, and in other embodiments at least 450%.

In one or more embodiments, the compositions pass a dead load shear test. The dead load shear test includes measuring the separation of a test sample, and where the separation is less than ⅛" (<3.17 mm), the sample is deemed to have passed the test. The overall test sample is prepared by adhering two EPDM strips together with a 1"×1" adhesive seam sample, and the test includes placing the sample under the tension of a 300 g weight for 24 hours at 158° F. The slip or movement is measured as the distance that the two EPDM strips separate.

INDUSTRIAL APPLICABILITY

The compositions of this invention may be used as a seam tape for roofing membranes. In particular embodiments, the roofing membranes include polymeric membranes, such as thermoset (e.g. EPDM) or thermoplastic (e.g. PVD or TPO) membranes, which are often used on flat or low-sloped roofs.

What is claimed is:

1. A pressure-sensitive adhesive polymeric composition comprising the blend or reaction product of:
    i. butyl rubber;
    ii. an olefinic polymer component;
    iii. filler that includes titanium dioxide; and
    iv. an unfunctionalized phenolic resin, where the composition is devoid of isocyanate or isocyanate residue.
2. The composition of claim 1, where said composition further comprises an oil.
3. The composition of claim 1, where the butyl rubber is a halogenated butyl rubber.
4. The composition of claim 1, where said filler includes at least 25 weight percent titanium dioxide.
5. The composition of claim 1, where said filler includes at least 50 weight percent titanium dioxide.
6. The composition of claim 1, where said filler includes at least 75 weight percent titanium dioxide.
7. The composition of claim 1, where said composition is formed in the presence of an amine catalyst.
8. The composition of claim 7, where said amine catalyst is triethylenediamine (TEDA), dimethylcyclohexylamine (DMCHA), dimethylethanolamine (DMEA), tetramethylbutanediamine (TMBDA), pentamethyldipropylenetriamine, N-(3-dimethylaminopropyl)-N,N-diisopropanolamine, 1,3, 5-(tris(3-dimethylamino)propyl)-hexahydro-s-triazine, bis-(2-dimethylaminoethyl)ether, N-ethylmorpholine, triethylamine (TEA), 1,8-diazabicyclo[5.4.0]undecene-7 (DBU), pentamethyldiethylenetriamine (PMDETA), benzyldimethylamine (BDMA), pentamethyldiethylene triamine (PMDETA), 2,4,6-tris[(dimethylamino)methyl]phenol, tributyl amine, N-methyl morpholine, or N-ethyl morpholine.
9. The composition of claim 1, where said olefinic polymer component includes a copolymer of propylene and an olefin.
10. The composition of claim 9, where said olefin is ethylene.
11. The composition of claim 9, where said copolymer includes at least 60 weight percent of said propylene.
12. The composition of claim 9, where said copolymer includes at least 80 weight percent of said propylene.
13. The composition of claim 9, where said copolymer includes at least 85 weight percent of said propylene.
14. The composition of claim 9, where said copolymer includes at least 90 weight percent of said propylene.
15. The composition of claim 1, where said composition includes at least 35 weight percent of said butyl rubber.
16. The composition of claim 1, where said composition includes at least 40 weight percent of said butyl rubber.
17. The composition of claim 1, where said composition includes at least 45 weight percent of said butyl rubber.
18. The composition of claim 1, where said composition includes less than 4 weight percent of said unfunctionalized phenolic resin.
19. The composition of claim 1, where said composition includes less than 2 weight percent of said unfunctionalized phenolic resin.
20. The composition of claim 1, where said composition includes less than 0.5 weight percent of said unfunctionalized phenolic resin.
21. The composition of claim 1, where said composition includes at least 0.1 weight percent of said filler.
22. The composition of claim 1, where said composition includes at least 0.5 weight percent of said filler.
23. The composition of claim 1, where said composition includes at least 1 weight percent of said filler.
24. The composition of claim 1, where said composition has a whiteness of at least an L value of 70.
25. The composition of claim 1, where said composition has a whiteness of at least an L value of 75.
26. The composition of claim 1, where said composition has a whiteness of at least an L value of 80.

* * * * *